March 31, 1925.

G. B. COLLIER 1,531,690

APPARATUS FOR THE PRODUCTION OF EXPLOSIVE MIXTURES

Filed Feb. 3, 1919

8 Sheets-Sheet 1

INVENTOR:
Guy B. Collier
by his attorneys
Van Everen Fish & Hildreth

March 31, 1925.

G. B. COLLIER 1,531,690

APPARATUS FOR THE PRODUCTION OF EXPLOSIVE MIXTURES

Filed Feb. 3, 1919    8 Sheets-Sheet 2

INVENTOR:
Guy B. Collier
by his attorneys
Van Doorn Field & Abbett

March 31, 1925.
G. B. COLLIER
1,531,690
APPARATUS FOR THE PRODUCTION OF EXPLOSIVE MIXTURES
Filed Feb. 3, 1919
8 Sheets-Sheet 3

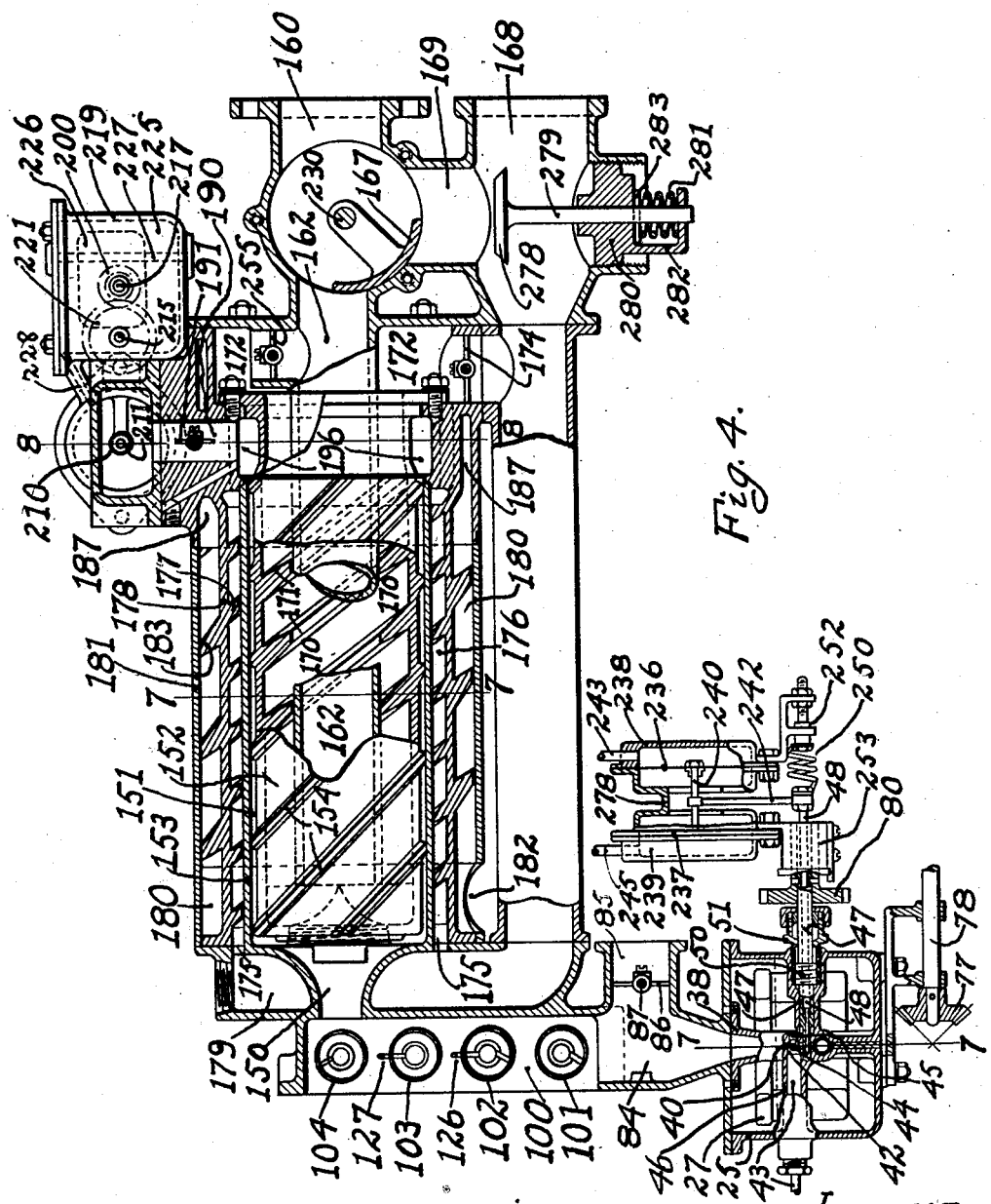

March 31, 1925.
G. B. COLLIER
1,531,690
APPARATUS FOR THE PRODUCTION OF EXPLOSIVE MIXTURES
Filed Feb. 3, 1919
8 Sheets-Sheet 5
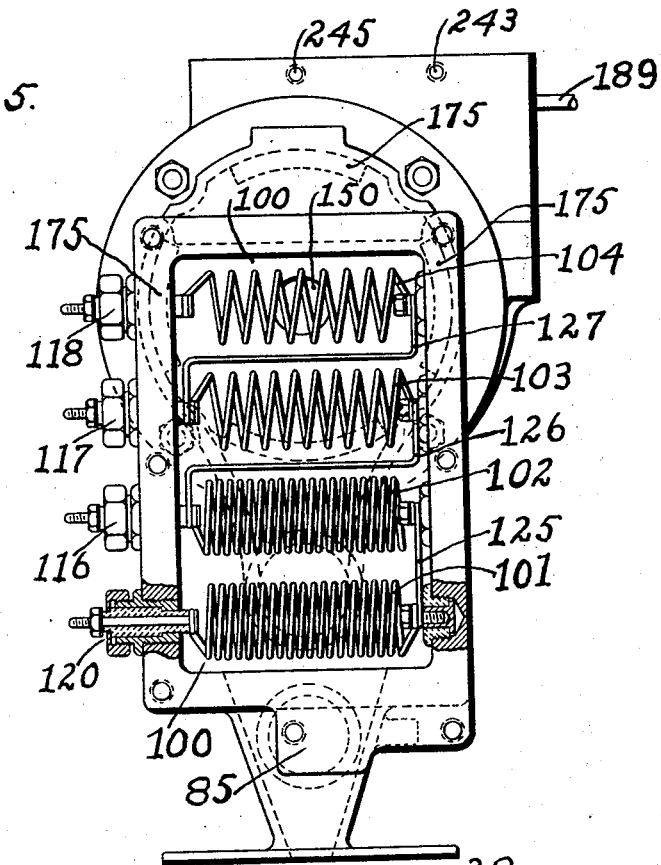
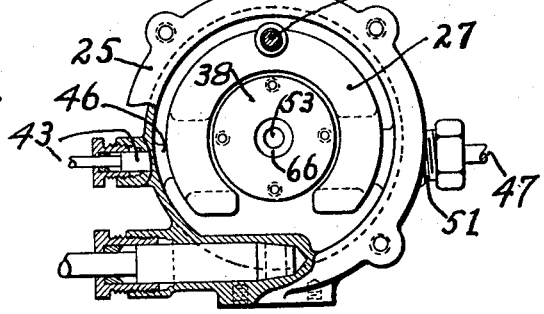
INVENTOR:
Guy B. Collier
by his attorneys
Van Everen Fish & Hildreth March 31, 1925.

G. B. COLLIER 1,531,690

APPARATUS FOR THE PRODUCTION OF EXPLOSIVE MIXTURES

Filed Feb. 3, 1919   8 Sheets-Sheet 6

INVENTOR:
Guy B. Collier
by his attorneys

March 31, 1925.
G. B. COLLIER
1,531,690
APPARATUS FOR THE PRODUCTION OF EXPLOSIVE MIXTURES
Filed Feb. 3, 1919　　8 Sheets-Sheet 7
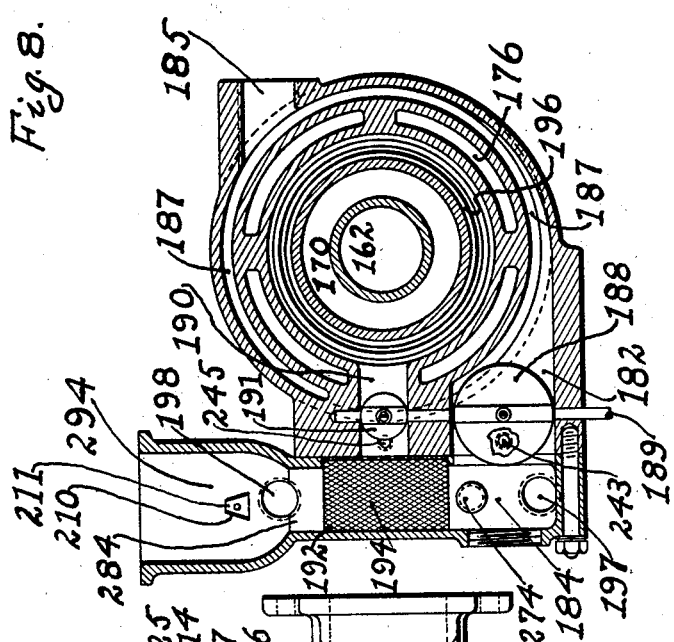
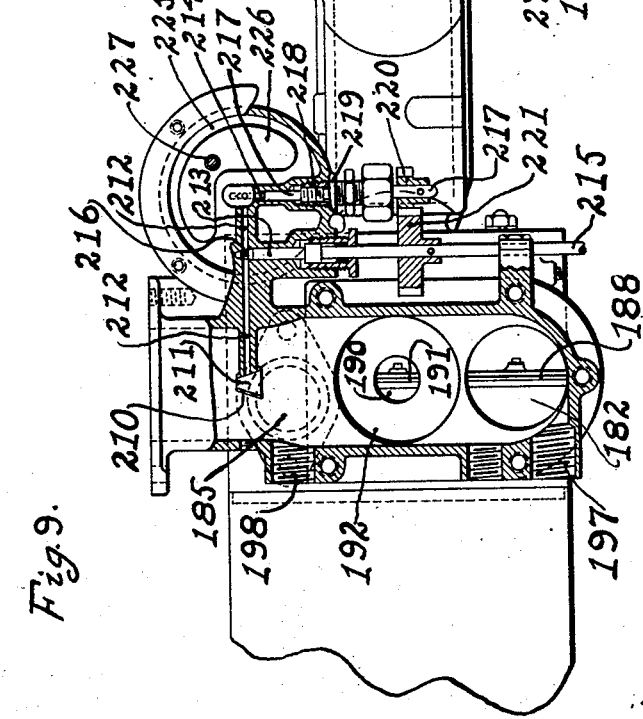
INVENTOR:
Guy B. Collier
by his attorney

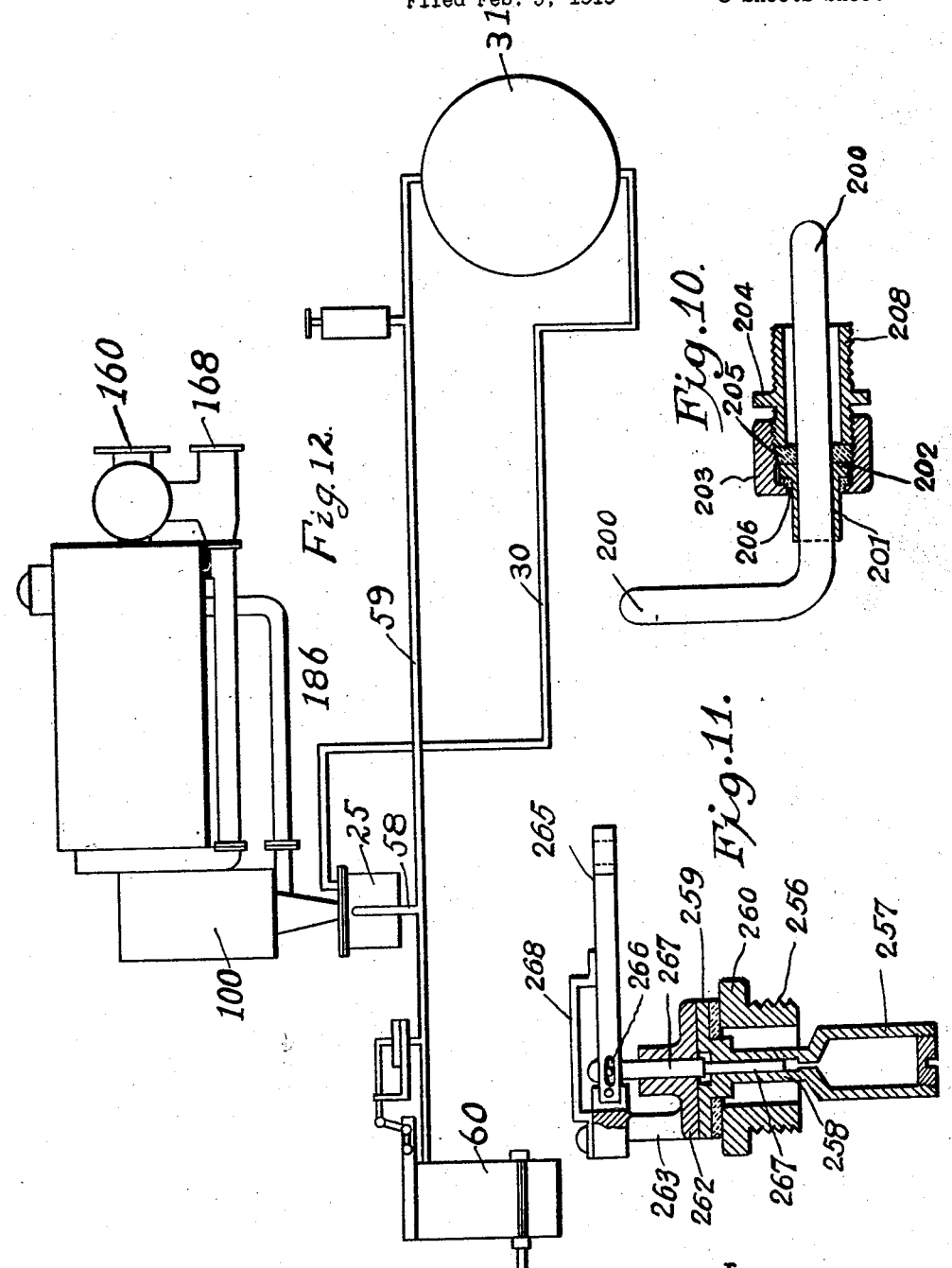

Patented Mar. 31, 1925.

1,531,690

UNITED STATES PATENT OFFICE.

GUY B. COLLIER, OF KINDERHOOK, NEW YORK.

APPARATUS FOR THE PRODUCTION OF EXPLOSIVE MIXTURES.

Application filed February 3, 1919. Serial No. 274,787.

*To all whom it may concern:*

Be it known that I, GUY B. COLLIER, a citizen of the United States, residing at Kinderhook, in the county of Columbia and State of New York, have invented certain new and useful Improvements in Apparatus for the Production of Explosive Mixtures; and I do hereby declare the following to be a full, clear, and exact description of the invention, such as will enable others skilled in the art to which it appertains to make and use the same.

The present invention relates to apparatus for the production of explosive mixtures and more particularly to apparatus of this character which utilizes to the best advantage liquid fuels having a low volatility.

The present invention is intended particularly as an improvement on the apparatus disclosed in the co-pending application of Collier Serial No. 179,674, filed July 10, 1917.

The object of the invention is to secure a thorough atomization and breaking up of the liquid fuel and its complete mixture with air to form a uniform and homogeneous combustible mixture.

With this object in view the several features of the invention consist in certain novel features of construction, combinations and arrangements of parts hereinafter described and claimed, the advantages of which will be obvious to those skilled in the art from the following description.

Figure 1:
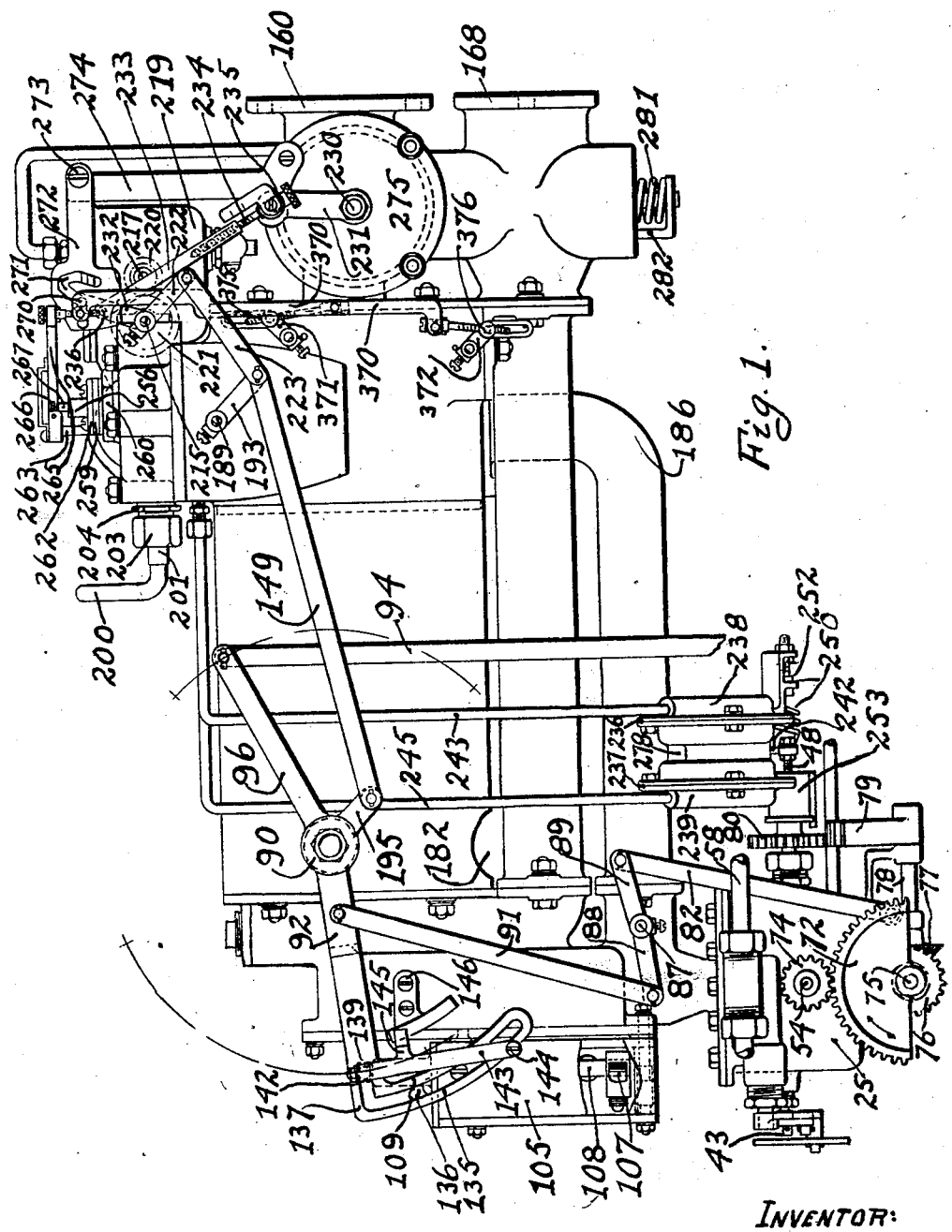
Figure 2:
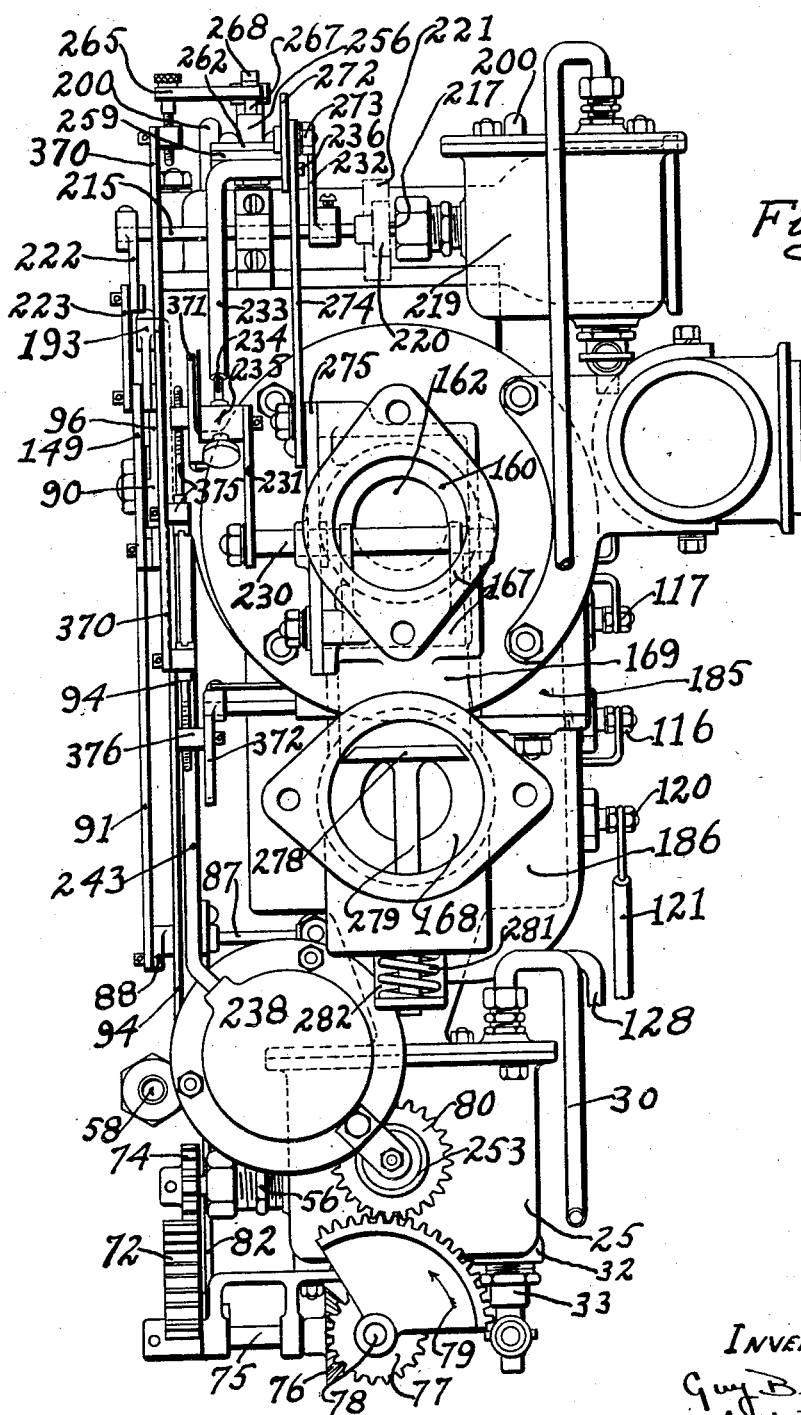
Figure 3:
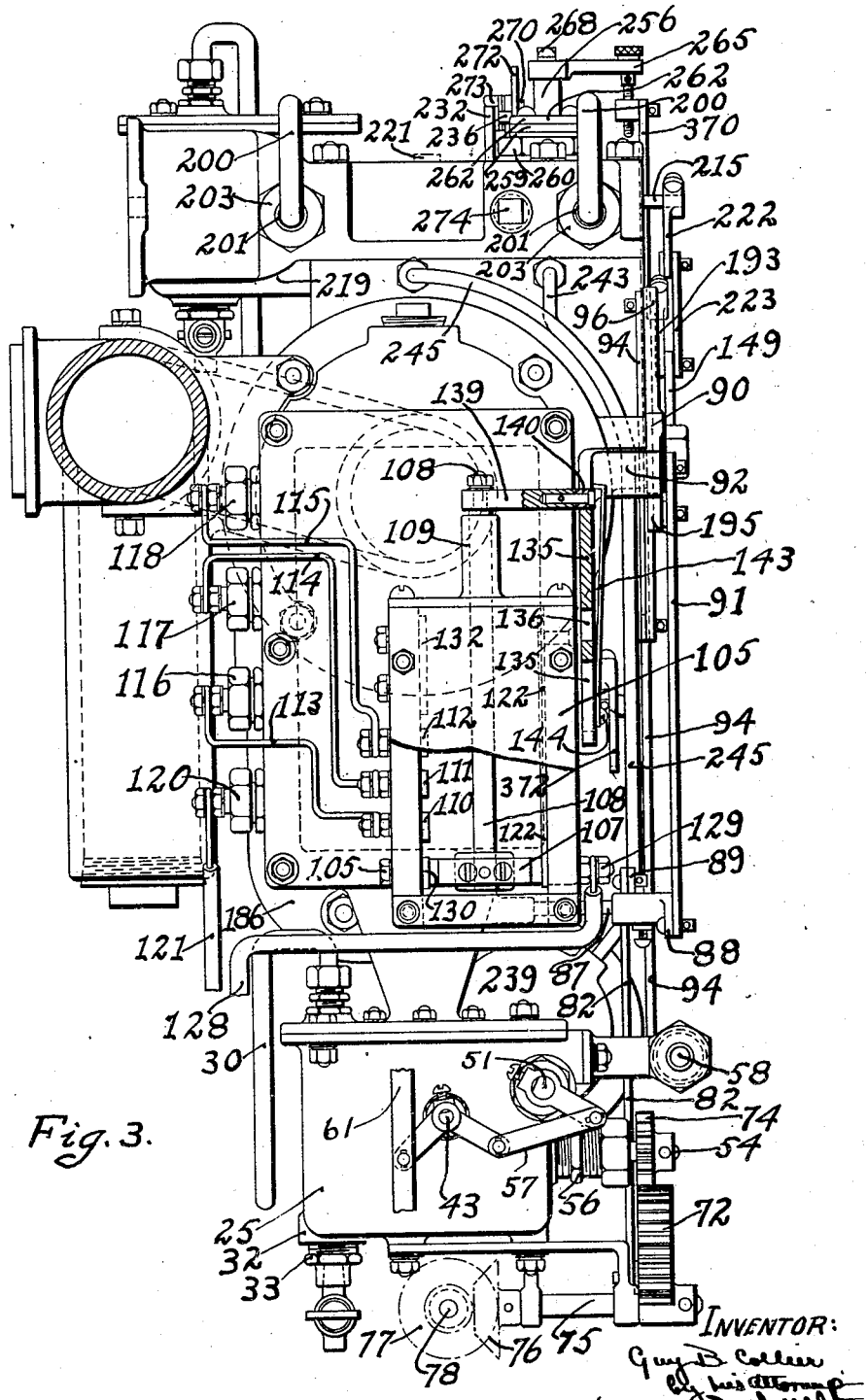
Figure 7:
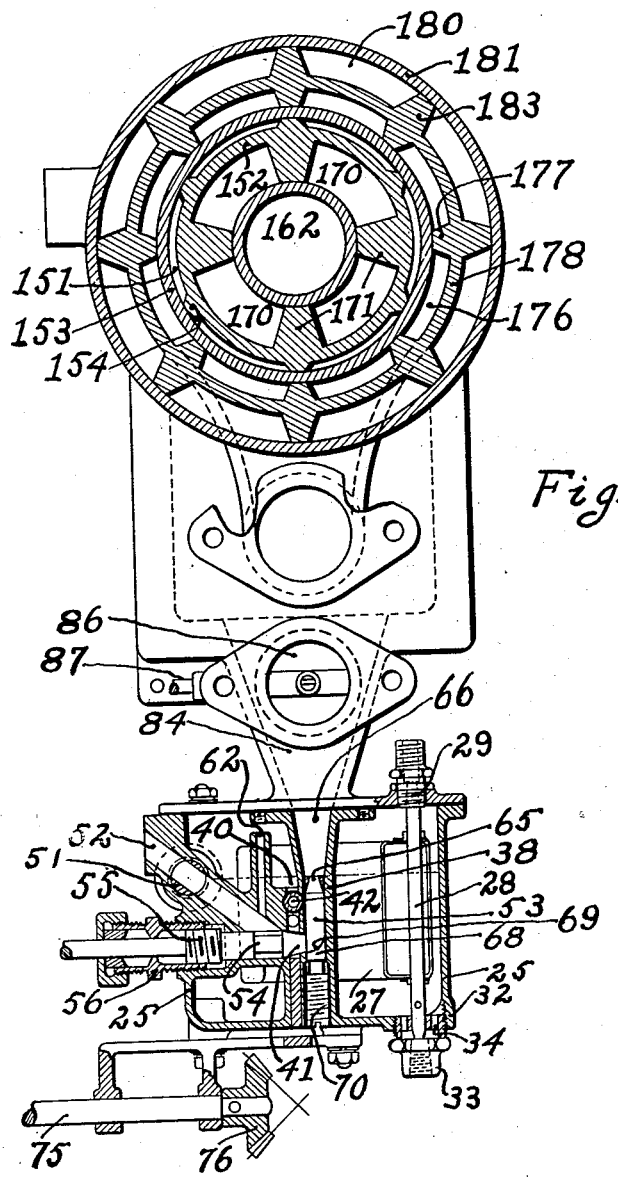

In the accompanying drawings illustrating the preferred form of the invention, Figure 1 represents a front elevation of the apparatus; Fig. 2 is a right hand end elevation; Fig. 3 is a left hand end elevation; Fig. 4 is a longitudinal section of the apparatus; Fig. 5 is a detail illustrating the electric heater with the cover plate removed; Fig. 6 is a detail showing a top plan view partly in section of the atomizer and float chamber; Fig. 7 is a section on the line 7—7 of Fig. 4 illustrating a cross section of the exhaust heater and atomizer; Fig. 8 is a detail illustrating a cross section taken upon the line 8—8 of Fig. 4 and showing the final mixing chamber; Fig. 9 is a detail showing a plan view partly in section of that portion of the apparatus illustrated in Fig. 8; Fig. 10 is a detail illustrating a section of the connections for retaining the thermometer in the wall of the mixing chamber housing; Fig. 11 is a detail showing a sectional view of the thermostat; and Fig. 12 is a diagrammatic view showing the general arrangement and various elements which co-operate for the production of the explosive mixture.

The apparatus shown in the illustrated embodiment of the invention is designed to initially secure a thorough atomization of the liquid fuel; to next mix with this atomized fuel a sufficient volume of air to produce a substantially saturated mixture of air and vaporized fuel upon receipt of the proper amount of heat; and to finally combine with the saturated mixture a sufficient volume of dilution air at a temperature properly determined to produce an explosive mixture having the most efficient proportions and at the desired temperature.

The liquid fuel is contained in a float chamber indicated at 25 and the level of the liquid within this chamber, indicated substantially in dot and dash lines in Fig. 7, is controlled by a float 27 of the usual type which is secured to a valve rod 28. This valve rod is provided with the usual needle valve 29 which controls the flow of liquid through the feed pipe 30 leading from the supply tank 31. The lower end of the rod 28 is guided in a bearing formed in a screw plug 33 at the bottom of the float casing 32. As shown in Fig. 7, the screw plug 33 serves to permit the dropping of the float and the draining of the float chamber through the openings 34 when so desired. The float chamber is provided with a tube 38 extending centrally therethrough from top to bottom and adapted to contain a chamber for the thorough atomization of the liquid fuel. The liquid is fed to the atomizing chamber from the float chamber through a passage 40 which is intercepted by a double needle valve 47 and a shut-off valve 42. The shut-off valve, as shown in Figs. 4 and 7, comprises a rotatable stem 43 having a passage 44 drilled therethrough which is adapted to register with the passage 40. The passage 45 formed in the valve communicates with the fuel at an opening in the end of a conical seat in a sleeve 46. The needle valve is located beneath the shut-off valve and comprises a hollow stem 47 containing a needle 48 extending throughout. The hollow stem is threadedly connected at 50 to a bushing 51 secured to the casing of the float chamber so that a rotary movement imparted thereto will move the hollow stem longitudinally to vary the passage area across the hole 40 and secure the ordinary range of adjustments for various throttle openings. An additional movement may be imparted to the needle 48 relative to the hollow stem to afford additional control of the fuel passage. In the illustrated embodiment of the invention this additional movement of the needle 48 is imparted automatically through mechanism to be hereinafter described. Fuel from the passage 40 runs on to the conical end 41 of the air valve 54 or on to its conical seat. Air is admitted to the atomizing chamber 53 through a passage 52 controlled by a valve 54 threadedly connected at 55 to a sleeve 56 threaded in turn in the float casing as shown in Fig. 7. The air passage is also controlled by a rotatable shut-off valve 51 which is connected with the stem of the shut-off valve 43 through a link 57, as indicated in Fig. 3. Both of these valves may be operated if so desired from the throttle through an operating rod indicated at 61. The air is fed under pressure to the passage 52 through a pipe 58 communicating with a pipe 59 which connects an air pump 60 with the top of the fuel tank 31, all as shown in Fig. 12. In order to equalize the pressure of the air and the liquid fuel entering the atomizing chamber a compensating passage 62 extends from the passage 52 to a point above the level of liquid in the float chamber and affords free communication between the passage and the upper portion of the float chamber, ensuring a pressure upon the liquid equal to the pressure of the air. The liquid and air under pressure enter the "atomizing chamber" 53 at the bottom and sweep upward with the liquid forming a tubular film about the column of air until the restricted orifice 65 is reached when upon passing out of the orifice the particles of liquid are successively sheared off from the film and thoroughly combined with the air column in the upper expanding portion 66 of the chamber. In order to facilitate the flow of liquid and air into the atomizing chamber and to direct it upwardly as well as to control the size of the passage the lower portion of the chamber is closed by a block 68 having a curved face 69, the block being adjustable in the passage by means of a threaded plug 70 engaged from the bottom of the float casing when desired. The fuel and air valves as in the previous type of apparatus are controlled in accordance with the movement of the throttle rod and to this end a gear segment 72 is journaled at the side of the float casing as shown in Fig. 1 and meshes with a pinion 74 secured to the stem of the air valve 54. The shaft 75 upon which the gear segment is mounted is provided with a bevel gear 76 which meshes with a second bevel 77 mounted upon a shaft 78 which carries a gear segment 79 meshing with a gear 80 secured to the outer tubular needle valve 47 as shown in Figs. 1 and 4. The gear segment 72 is provided with a link connection 82 for operating it through connections to be hereinafter described.

After its thorough atomization the liquid is conveyed by the air column into the chamber 84 where it is further mixed with "saturation air" entering through the passage 85 controlled by the valve 86. The valve 86 is also controlled in accordance with the throttle openings and to this end is mounted upon the stem 87 to which is connected an operating arm 88. A second arm 89 connected to the stem extends to the end of the link 82 to operate the fuel and air valves, as hereinbefore described. The arm 88 is connected to a rotary controlling head 90 through a link 91 and arm 92. The control head 90 is connected to the throttle rod 94 through an arm 96 extending therefrom. The mixture of air and liquid is now heated to a substantially predetermined temperature whereby the air becomes saturated with the vapor formed, some of which may become superheated. It is desirable that this heating of the mixture may be accomplished as efficiently and economically as possible and also be effective for various conditions of load and positions of throttle. To this end electric heating mechanism is employed for raising the temperature of the mixture upon starting the motor and for light loads and a heater operated by the exhaust gas of the motor is employed for normally heating the mixture during the operation of the motor from a lighter to a full load. As shown in Figs. 4 and 5 the saturated mixture passes directly from the chamber 84 into a heater casing 100 having heating coils 101, 102, 103 and 104 located, respectively, therein. The operation of these heating coils is controlled through a switch mechanism, indicated at 105 in Figs. 1 and 3, located upon the outside of the heater casing cover. The controlling switch comprises a contact member 107 moving in a rectilinear path and secured to a stem 108 sliding in a tubular bearing 109 formed in the upper part of the switch casing. This movable contact is adapted to engage, respectively, in different positions with stationary contact members 110, 111 and 112, which are connected, respectively, through leads 113, 114 and 115 with terminals 116, 117 and 118 located upon the outside of the heater casing, as shown clearly in Figs. 3 and 5. The circuit has leads 121 and 128. The lead 128 joins a terminal 129 which connects with an elongated contact 122 that is always engaged by the opposite side of the moving contact member 107; while the lead 121 joins a terminal 120. Upon referring to Figure 5 it will be noted that the coils 101 and 102 are connected by a lead 125; that the coils 102 and 103 are connected by a lead 126; and that the coils 103 and 104 are connected by a lead 127 so that when the movable contact member is in engagement with the stationary contact 110 the coils 101 and 102 are thrown into the circuit; when the contact member 107 is moved to a position in engagement with the contact 111 the three coils 101, 102 and 103 are in circuit; and when the movable contact 107 is moved to a position in engagement with the contact 112 all four coils are in circuit to give the maximum designed heating effect. These coils are designed to be thrown into operation at comparatively small throttle openings; for example, from one thirty-second throttle opening to one-eighth full throttle opening. When the throttle is closed or open less than one thirty-second of the full opening the movable contact member 107 is retained in the position shown in Figure 3 in engagement with a contact 130 which is not connected with any of the coils. On the other hand when the throttle is opened beyond a predetermined point which in the illustrated embodiment of the invention is substantially one-seventh of the full throttle opening, the member 107 is moved into engagement with the contact 132, as shown in Figure 3, so that the heating coils are again thrown out of circuit. As the heating coils are only employed over a comparatively small portion of the range of throttle opening, it is desirable to provide mechanism for moving the switch member or movable contact 107 during only a portion of the travel of the throttle. To this end, as shown in Figs. 1 and 3 of the drawings, the arm 92 is provided with a curved extension 135 having a slot 136 formed therein which has a transverse portion 137. The upper end of the stem 108 is provided with a laterally extending post 139 having a roll 140 journaled thereon which is received in the slot 136, as shown in Figs. 1 and 3. With this construction when the throttle is opened only to a slight degree the parts are in the position shown in Figure 1 and as the throttle opening is increased the mouth 142 of the arm 92 is swung about the hub 90 in substantially the path indicated in dash lines. During the initial upward movement of the arm 92 the roll 140 is retained in the transverse portion 137 of the slot and partakes of the movements of the arm. At a predetermined point in the upward movement of the arm, however, the roll enters the curved portion of the slot 136 and thereafter the upward movements of the arm 92 do not affect the arm 139. When this action takes place the contact member 107 has reached a position in engagement with the contact 132 and the heating coils have been thrown out of circuit. With this construction it will be evident that the full range of movement of the arm 92 is permitted while only a small portion of the movement is utilized to operate the switch member. As has been explained before, the heating coils are thrown out of action before the throttle is completely closed and to this end it is desirable to provide means for permitting a continued movement of the arm 92 without affecting the position of the contact member 107 after a certain point has been reached. To this end the upper portion of the arm containing the transverse slot 137 is cut away at 142, as shown in Figure 1, and a spring hook or catch 143 fastened at 144 to the curved segment 135 projects into the opening 142 at its upper end and normally retains the roll 140 within the slot. This spring catch is provided with a finger 145 extending laterally which rides upon a stationary cam plate 146 designed to remove the upper end of the catch from above the roll 140 and permit the roll to pass through the opening 142 at the desired point in the movement of the arm 92. This affords efficient and positively acting mechanism for controlling the heating effect of the electric heater in accordance with the extent of throttle opening.

The provision of the electric heater ensures that the explosive mixture shall be raised to the desired temperature at small throttle openings when the volume of exhaust gas would not be sufficient in and of itself to accomplish this result but is is desirable so far as possible to utilize the heat of the exhaust gases themselves and to this end the mixture, after leaving the electric heater, passes into and through an exhaust heater of efficient form. Upon referring to Figure 4 of the drawings it will be noted that the chamber 100 in the electric heater is connected through a flaring passage 150 with an annular heating space 151 formed between the peripheral surfaces of two concentric shells 152 and 153. The shell 152 is provided with a series of uniformly spaced oblique ribs 154 which divide the heating space into a series of oblique passages ensuring intimate contact of the explosive mixture with all portions of the inner heating shell 152. The saturated mixture passes from the annular space 151 into an annular outlet ring or reservoir 196. The exhaust gases employed for heating the explosive mixture enter the heating member through a passage 160 communicating with a centrally located passage 162 through a valve 167. After the gases have passed through the heater they are returned through an outlet passage 168 which also communicates with the inward passage 160 through a short passage 169. The valve 167, as indicated clearly in Figure 4, controls the proportionate amount of exhaust gases which pass into the central passage 162 and into the passage 169 and thence into the exhaust pipe 168 without passing into the heater. As shown, the valve permits a substantially equal flow of exhaust gases into the passages 162 and 169, but this valve through suitable connections may be properly adjusted to control the flow of gas in accordance with the temperatures registered by said thermometers to be hereinafter described. After passing throughout the length of the pipe 162 the exhaust gases are returned rearwardly through an annular chamber 170 which is divided by oblique ribs 171 into a series of oblique passages, for effectually heating the shell 152 and the rich mixture surrounding it. After the exhaust gases have completely traversed throughout the length of this shell they are delivered to a chamber 172 and thence to an annular chamber 176. A certain portion of the exhaust gases which are delivered to the passage 162 instead of traversing through the length of the heater in this passage flow, when permitted by a valve 255, into the chamber 172 which communicates with the annular chamber 176. This is divided by oblique ribs 177 formed on an annular shell 178. These gases, after traversing through the length of the heater, exhaust through a chamber 175 into a chamber 179 interposed between the end of the heater and the wall of the electric heater communicating at its opposite end with the outlet passage 168. Surrounding the shell 178 is an annular chamber 180 formed by the outer shell 181 and serving to heat the dilution air which enters through an opening 182, at the bottom of the heater. This dilution air is caused to traverse all portions of the chamber through the provision of oblique ribs 183 formed upon the exterior surface of the shell 178. Thus it will be seen that the saturated mixture of fuel and air is heated to a comparatively high temperature during its flow through the heater by the exhaust gases flowing through the passages 170 and 176 and the dilution air is heated to a lower temperature by the exhaust gases flowing through the passage 176. A portion of the dilution air, so called, after passage through the heater is diverted through an opening 185, Figures 8 and 2, into a passage 186 shown in Figure 1 which communicates with the passage 85 for furnishing saturation air to the atomized fuel. The dilution air enters the chamber 187, indicated in Figure 8, communicating with the chamber 180, and affording communication between the chamber 187 and a space 184 from which it flows to the mixing chamber 192. The amount of dilution air entering the mixing chamber 192 is controlled by a butterfly valve 188 supported upon a horizontal stem 189. The saturated mixture which has been heated to a higher temperature, enters the mixing chamber through a passage 190 controlled by a valve 191 supported upon the stem 189. The passage 190 communicates with an annular space 196 and thence with the annular space 151, the annular space 196 containing the saturated mixture. This saturated mixture passes into the mixing chamber 192 through a screen 194 supported as shown in Figure 8 upon a perforated plate. The opening of these valves is controlled automatically in accordance with the opening of the fuel and air valves initially described and to this end the valve stem 189 is provided with an arm 193 connected to the controlling member 90 through a link 149 and an arm 195 projecting from the controlling head.

According to the best information at present available it is preferred to have the temperature of the saturated mixture at the final mixing point approximately 280 degrees F. and the temperature of the dilution air at approximately 100 degrees F. in order that the temperature of the resulting mixture shall be best suited for extrance into the engine. In order to afford a determination as to the temperatures at different points, the chamber 186, containing dilution air only, and the chamber 284, containing explosive mixture, are provided with threaded openings 197 and 198 into which the thermometers 200 are placed. These incate, respectively, the temperature of the dilution air and the temperature of the final explosive mixture which should be about 125 degrees F. The type of connection for securing the thermometer in these openings is indicated generally in Figure 10 in which an L-shaped thermometer tube 200 is shown as mounted within a sleeve 201 having an annular flange 202. A collar 203 is threadedly received on a connecting sleeve 204 and serves to firmly secure the thermometer tube to the connecting sleeve through a yielding gasket 205 interposed between the sleeve 201 and the sleeve 204 and a yielding washer 206 interposed between the collar 203 and the flange 202 formed upon the sleeve 201. This construction permits the tube to be connected to the sleeve 204 and at the same time permits the maintenance of a gas-tight joint between the tube and the connector sleeve 204. The connector sleeve 204 is provided with a threaded end 208 which is received in the openings 197 and 198 formed in the walls of the chambers 184 and 284. These thermometers do not control the temperature of the mixture but merely serve to indicate whether the apparatus is functioning in the desired manner.

It may be and usually is desirable to mix a certain predetermined quantity of water with the combustible mixture and to this end a spray hood 210 is located between the chambers 284 and 294 and comprises a conical passage 211 communicating with a transverse feed passage 212 controlled by a shut-off valve 213 and a needle valve 214. The shut-off valve, as indicated in Figure 9, comprises a stem 215 with a passage 216 drilled therethrough in such a manner that the passage of the water through this valve is permitted during the operation of the motor. The needle supply valve 214 comprises a stem 217 threadedly connected at 218 to a sleeve screwed into a float casing 219 so that rotation of the stem will move the valve longitudinally to vary the size of the openings. The outer end of the stem 217 is provided with a small gear 220 which meshes with a larger gear 221 secured to the stem 215 of the valve 213. The movements of these valves are controlled in accordance with the throttle opening through an arm 222 secured to the stem 215 and connected to the arm 193 through a link 223. The water is contained in the usual float chamber 225 and the level is controlled through a float 226 mounted upon a valve rod 227 to control the flow of water to the chamber in the usual manner through a valve, not shown. The pressure upon the water in the float chamber 225 is maintained substantially equal to the pressure within the chamber 185 by a compensating passage, indicated at 228 in Figure 4.

The position of the segment valve 167 for proportioning the flow of exhaust gases into the passages 162 and 169 is also controlled automatically in accordance with the throttle opening. This valve 167 is mounted upon the stem 230 having an arm 231 which is operated through the following system of connections: The stem 215 has an arm 232 carrying a pin end 270 which moves in a channel 271 in a rocker arm 272 fastened by a screw 273 to a stationary member 274 secured to a plate 275. An adjustable link 233 has an end pinion 236 passing through the rocker arm 272. Movement of the throttle rod 94 rotates the arm 222, the stem 215 and the arm 232, its pin 270 moving in the "cam slot" 271 to cause the rocker arm 272 to move in a prescribed manner such that the pinion 236 imparts to the arm 231, and thence to the valve 167, the desired movements and position relative to the throttle for admitting the proper percentage of exhaust gases to the passage 162. As shown in Figure 1 the link 233 is provided with a threaded socket which receives the member 234 journaled in the hub 235 formed upon the end of the arm 231 and serving to vary the set positions of the segment 167 with reference to the throttle.

When it is desired to control the flow of liquid fuel to compensate for conditions independent of the throttle opening the position of the inner needle valve 48 is controlled in accordance with the relative pressure of the saturated mixture and the dilution air at suitable regions near the mixing chamber 192. The stem of the inner needle valve 48 at its rear end is connected to a pair of diaphragms 236 and 237 which are clamped between the casings 238 and 278 and 278 and 239. The two diaphragms are rigidly connected to the end of the valve stem 48 by a strut rod 242. The closed member formed by the diaphragm 236 and the casing 238 communicates with the dilution air chambers 187 and 184 through a pipe 243 and the closed chamber formed by the diaphragm 237 and the casing 239 communicates with the passages 196 and 190, through which the saturated mixture flows, by a pipe 245. The opposing or inner faces of the diaphragms are in free communication with the atmosphere and thus it will be seen that the position of the diaphragms and the inner needle valve stem rigidly connected thereto will be dependent upon the relative pressure of the saturated mixture and the dilution air prior to entering the mixing chamber 192. A light spring 250 connecting the end of the valve stem with an adjustable head 252 serves to normally determine the position of the valve and to resist movements of the valve stem except upon a distinct change in pressure and to limit movement. The diaphragm casings are rigidly connected together and to a head 253 supported upon the outer needle valve stem 47 so that they partake of the longitudinal movements of this valve with different throttle openings. A screw plug 274 enters the chamber 184 and serves to check the flow of dilution air into the mixing chamber 192. Nominally it is supposed to check the flow to such an extent that the total flow resistance of dilution air from its entrance at 182 into the mixing chamber at 192 is substantially equal to the total flow resistance experienced by the saturated mixture throughout its paths to the mixing chamber 192. The above holds approximately for all proportionate mass flows due directly to a normal load corresponding to any prescribed position of the throttle. If the resisting torque is suddenly decreased at a fixed throttle opening the engine speed increases and the suction pressure falls. As the saturation mass is practically constant at fixed throttle openings, the pressure in 176, 190 and 245 falls faster than in 187, 184 and 243. This causes the difference in pressure upon opposite sides of the diaphragm to move the inner needle valve 48, decreasing the flow area of fuel at the fixed position of the throttle opening. The mixture then becomes weaker so that the engine slows down to its lighter load. Thus compensation is made for constant speed and variable quality of mixture.

It is desired to govern the positions of the valves 174 and 255 for controlling the flow of exhaust gases in accordance with the temperature of the explosive mixture. With this end in view a thermostat 256 is received in the wall of the chamber 184, as shown in Figure 11, and comprises a closed tube 257 adapted to project into the chamber 184 and to contain mercury or other expansible liquid affected by the temperature. This tube has a stem 258 of restricted diameter terminating in an annular flange 259 joined to a connector bushing 260 which is threaded in the casing in the usual manner. A head 262 rigidly connected to the flange 259 is provided with an arm 263 to which is pivotally connected a swinging arm 265. This swinging arm 265 is joined through a pin and slot connection 266 to a movable plunger 267 sliding within the passage formed in the restricted portion 258 of the thermostat 256. This plunger is moved in accordance with the expansion or contraction of the liquid contained within the tube 257 and acts to swing the arm 265, the movements of which may be normally resisted by a leaf spring 268 having its free end bearing upon the arm and rigidly secured at its opposite end to the member 263. The free end of the swinging arm 265 is adjustably connected to a link 370 which in turn is adjustably connected at separated points to arms 371 and 372 mounted upon the stems of the valves 255 and 174. This causes the opening of these valves to be controlled in accordance with the temperature of the dilution air and the adjustable connections between the link and the arms indicated at 375 and 376, respectively, permit an independent adjustment of the valves. When dilution air is too cool to give the proper temperature to the mixture in the chamber 284 (beyond the mixing chamber 192) and the arm 265 of the thermostat has fallen, the valve 174 remains closed while the valve 255 opens, admitting some of the higher temperature exhaust direct to the space 172 and thence permitting it to flow through the annular space 176, giving more heat to the dilution air (larger mass) and less to the saturated mixture. If the mixture in the chamber 192 becomes too hot the arm 265 rises and the valve 174 opens, while the valve 255 remains closed. Some of the exhaust is thus discharged from the system and a lesser amount passes through the space 176 so that the dilution air is made cooler and the temperature of the mixture comes back to its normal value.

The area of the passage 169 connecting the inlet passage 160 for the exhaust gases with the return passage 168 is controlled in addition to the segmental valve 167 by a valve 278 mounted upon a stem 279 received in a head 280 threaded in the under side of the return pipe and normally retained in the position shown in Figure 4 by a coiled spring 281 surrounding the valve stem and interposed in a stationary bracket 282 and a pin 283 passing through the valve stem. This valve serves as an additional means of control to regulate the flow of exhaust gases directly into the delivery pipe without passing through the heater. The valve 278 makes a flow resistance from the passage 160 to the passage 169 and to the passage 168 equal approximately to the flow resistance from the passage 160 to the passage 162 throughout the system to the chamber 175 and thence on to the passage 168.

While it is preferred to employ the specific construction and arrangement of parts shown and described, it will be understood that this construction and arrangement is not essential except as far as specified in the claims, and may be changed or modified without departing from the broader features of the invention.

The invention having been described, what is claimed is:

1. An apparatus for the production of explosive mixtures comprising means for producing a saturated mixture of air and liquid fuel, a heater casing through which the mixture is conducted, a plurality of heating coils located in the casing, and connections between the heating coils and throttle for causing successive heating coils to be thrown into circuit as the throttle is opened.

2. An apparatus for the production of explosive mixtures comprising a plurality of heating coils, a switch member for the heating coils movable in a rectilinear path, a throttle connection, and connections between the throttle and switch for moving the switch member during only a predetermined portion of the movement of the throttle connection.

3. An apparatus for the production of explosive mixtures comprising a series of heating coils, a switch member for throwing the heating coils successively into circuit, a throttle connection movable in a predetermined path, and means for connecting the switch member with the throttle connection adapted to permit movement of the throttle at the beginning and end of the path without correspondingly moving the switch member.

4. An apparatus for the production of explosive mixtures comprising a heater casing having passages for the flow therethrough of the saturated mixture, for the flow of dilution air, and for the flow of exhaust gases, a thermostat, and means operated by the thermostat for controlling the proportion of exhaust gases admitted to heat the passages for the saturated mixture and dilution air, respectively.

5. An apparatus for the production of explosive mixtures comprising means for initially atomizing liquid fuel and air, means for thereafter heating the mixture of fuel and air to a predetermined temperature, means for injecting water into the mixture of fuel and air, and means for maintaining the water under a pressure substantially equal to the pressure of the fuel and air mixture.

6. An apparatus for the production of explosive mixtures comprising a fuel valve, a dilution air chamber, a saturated mixture chamber, and connections between the two chambers for automatically governing the position of the fuel valve in accordance with the respective pressures in the chambers.

7. An apparatus for the production of explosive mixtures comprising a fuel valve, a pair of diaphragms, connections between the fuel valve and opposing faces of the diaphragms, chambers, respectively, for saturated mixture and dilution air, and connections between these chambers and the opposite faces of the diaphragms to govern the position of the fuel valve in accordance with the pressure in the two chambers.

8. An apparatus for the production of explosive mixtures comprising a float chamber, an atomizing chamber, means for injecting liquid fuel and air under pressure into the atomizing chamber, means for compensating for differences of pressure between the liquid fuel and air, and means for thereafter mixing the liquid fuel and air above the atomizing chamber.

9. An apparatus for the production of explosive mixtures comprising electric heating members, means for delivering a mixture of liquid fuel and air to the electric heating members, connections between the electric heating members and throttle for varying the heating effect in accordance with the throttle opening, an exhaust heating members, and means for passing the mixture of fuel and air from the electric heating member to the exhaust heating member.

GUY B. COLLIER.